Figure 1:
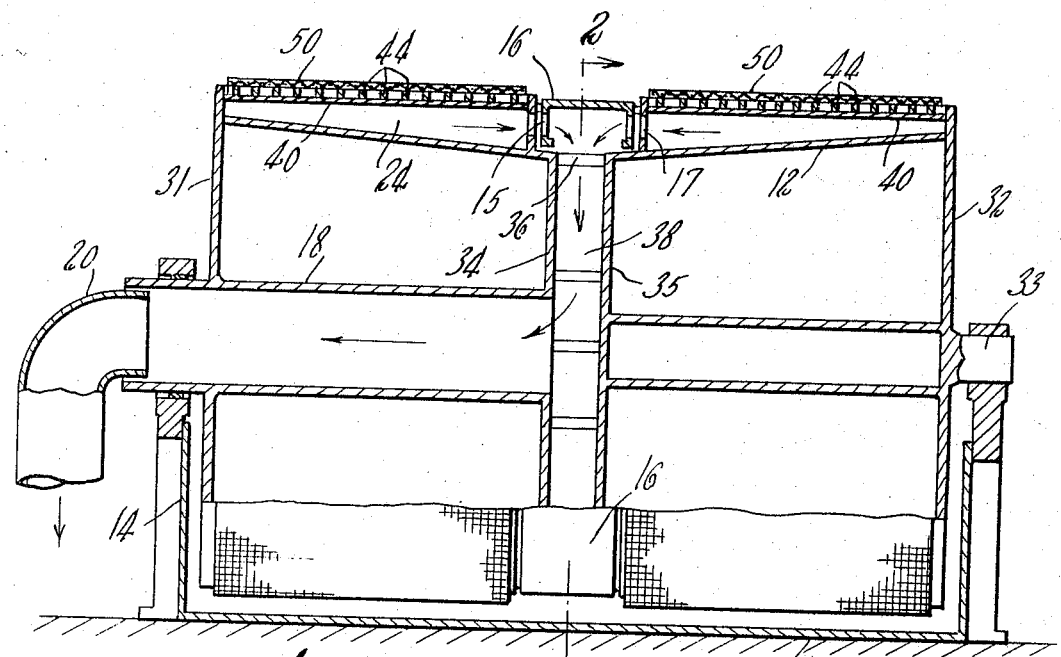

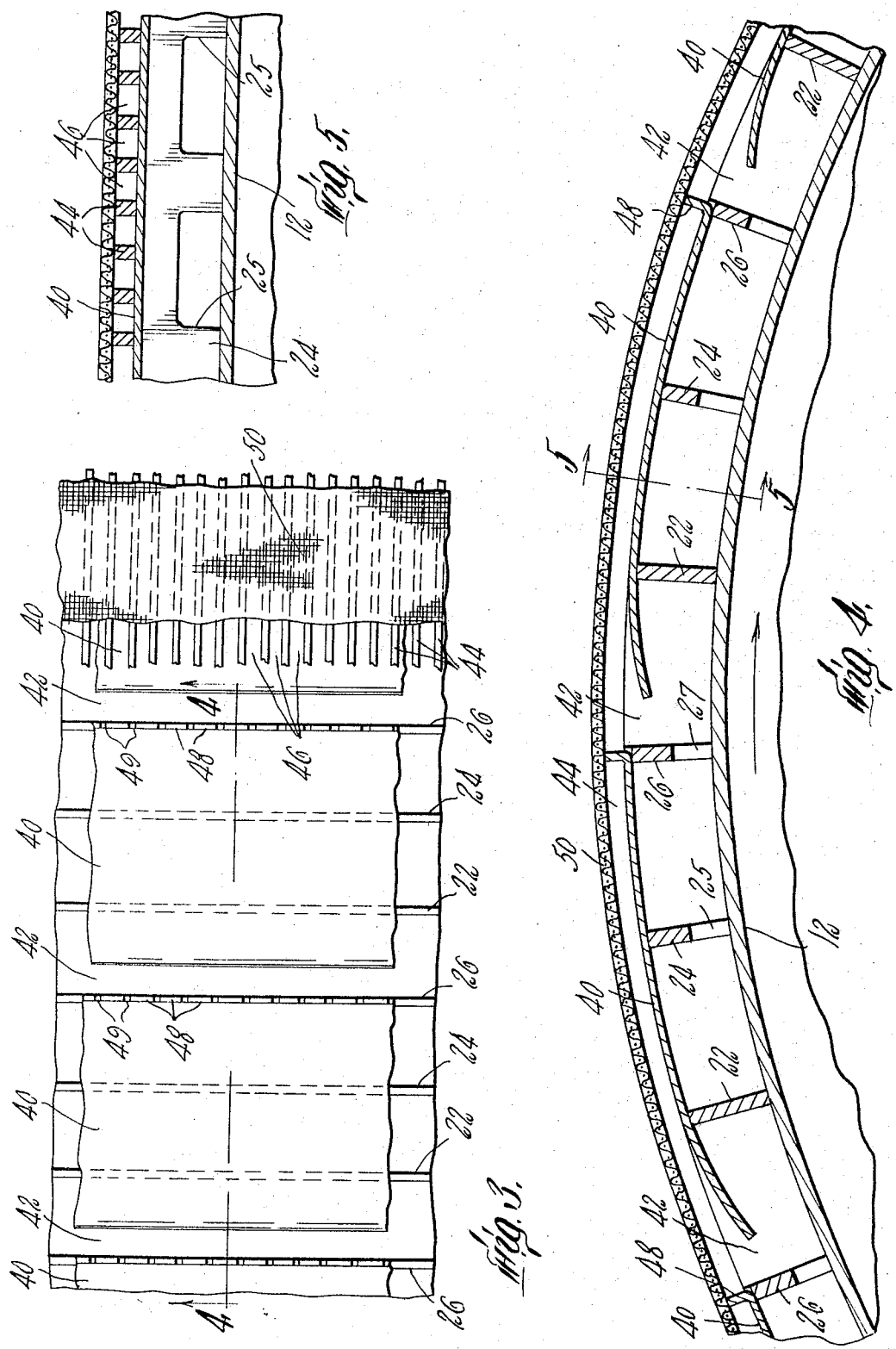

United States Patent Office 3,306,460
Patented Feb. 28, 1967

3,306,460
WIRE WOUND FILTER WITH UNDERLYING PERIPHERALLY SPACED COVER ELEMENTS
Oscar Luthi, Nashua, N.H., assignor, by mesne assignments, to Improved Machinery Inc., Nashua, N.H., a corporation of Delaware
Continuation of application Ser. No. 338,995, Jan. 20, 1964. This application June 28, 1966, Ser. No. 561,295
14 Claims. (Cl. 210—404)

This application is a continuation of my copending application Serial No. 338,995, filed January 20, 1964, now abandoned.

This invention relates to drum filters and more particularly to a novel construction of the filter surfaces and underlying filtrate compartments thereof.

Heretofore, the conventional rotary drum filter or "screen," such as is commonly used in the separation of wood pulp from its filtrate, was of generally cylindrical shape of dimensions up to about 20' long and 14' in diameter and rotated in a slurry contained in a suitable vat. The outer surface of the drum was provided with radially extending ribs about 2 to 8 inches high mounted on the drum generally axially thereof on about 2 to 5 inch spacing. These ribs in turn supported on their outer edges spaced wires of round or other cross section which were generally wound circumferentially of the drum and supported a screen of suitable mesh forming the filtering surface. The spaces between the ribs were usually connected either centrally or at their ends individually or in groups to a plurality of openings in the drum which communicated with a plurality of longitudinally extending manifolds spaced about the drum. Such manifolds were generally connected to a single port valve so that they were operated as the drum revolved to apply reduced pressure to the filter surface.

In the usual cycle, such arrangement provided for filter cake accretion and, if desired, washing by suitable showers spaced about the drum, as well as the elimination of the suction and/or application of positive pressure for discharge of the filter cake as by a doctor or other suitable means.

In a typical cycle of operation of such prior art structure, assuming clockwise rotation of the drum, suction applied to the manifolds connected to the drum surface between its 4 o'clock to 8 o'clock position moved water through the filter surface and so accreted the filter cake. As the manifold moved between its 8 and 10 o'clock positions, the reduced pressure extracted water from the cake and pulled air through the cake to dry it. A shower might be applied to the cake at the 10 o'clock position and again the cake was either dried or more showers or press rolls used for washing or thickening from the 10 to the 2 o'clock position where atmospheric air might be introduced into the manifold so that the filter cake could be removed from the drum by the usual doctor blade or other devices. The atmospheric air introduced into the just-discharged manifold then had to be removed by the vacuum source before the cycle could begin again.

Such drums have serious limitations, both as to construction and operation, which are solved by the novel construction of the present invention.

One of the more important of the operational limitations has to do with the inability of drum filters of the conventional construction above described to achieve rapid and simultaneous enough removal of water and other liquid from all passages adjacent to the filter cake, to prevent reabsorption or rewetting of the filter cake prior to its discharge. This problem has to some extent been solved by the drum filter of Patent No. 2,998,883, but with that structure there still remained serious constructional problems.

The present invention solves the above mentioned problem while retaining the advantages of the peripherally grooved configuration of Patent No. 2,998,883, as well as making possible the modification of conventional drum structures in order to take advantage of the present invention.

Accordingly it is a major object of the invention to provide a novel filter drum construction having a multiplicity of peripherally extending passageways beneath the filter medium with discharge thereof preferably generally centrally of a filtrate compartment for rapid removal of filtrate from adjacent the filter cake to prevent its return to the filter cake.

It is a particular feature of the invention that it is readily adapted to the modification of drum filters of conventional construction, so that they may take advantage of the invention.

In general, the rotary drum filter of the present invention utilizes a novel filter element, in the form of a plurality of peripherally spaced axially extending sheet material cover elements mounted on axially extending ribs extending radially outwardly from an underlying drum, so that the cover elements cover the entire surface of the drum and provide axially extending slots between adjacent cover elements, a plurality of peripherally extending closely spaced ridge elements being positioned on the outer surfaces of the cover elements, providing a multiplicity of peripherally extending grooves therebetween. The axially extending ribs form filter compartments into which the filtrate is admitted preferably generally centrally thereof in a peripheral direction and from which filtrate is removed by a stationary center valve structure or any conventional valve. Preferably the ridge elements are formed by a helically wound wire of rectangular cross section having a multiplicity of closely spaced turns. A sheet filter medium is provided to cover the grooved surface to provide the filter surface through which filtrate may pass into the grooves and thence through the slot openings into the filtrate compartments.

Figure 2:
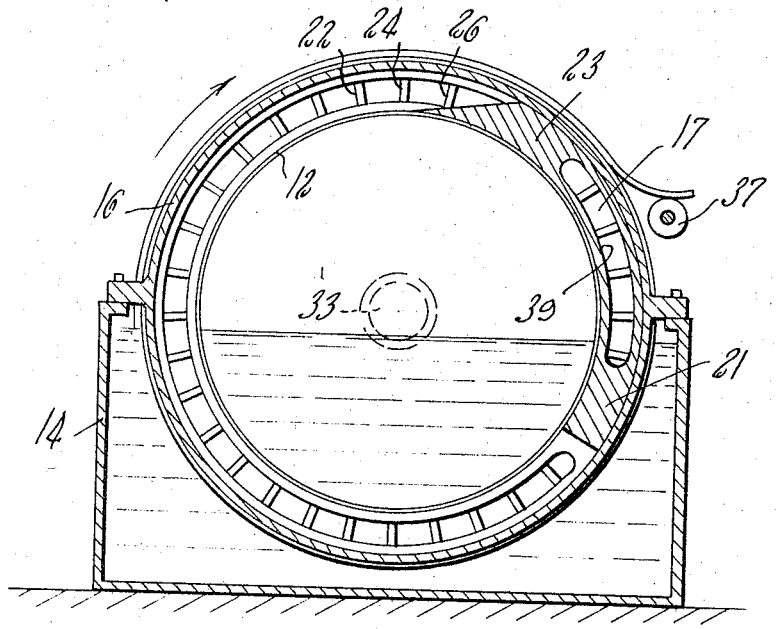

For the purpose of more fully explaining further objects and features of the invention, reference is now made to the following detailed description of a preferred embodiment thereof, together with the following drawings, wherein:

FIG. 1 is a side elevational view partly in section of a rotary drum filter according to the present invention;
FIG. 2 is a side sectional view of the filter of FIG. 1;
FIG. 3 is an enlarged section view of a portion of the filter of FIG. 1, partly broken away;
FIG. 4 is an enlarged sectional view, taken on the line 4—4 of FIG. 3, and
FIG. 5 is an enlarged sectional view taken on the line 5—5 of FIG. 4.

Referring to the drawings, in FIGS. 1 and 2 is shown a rotary drum filter including a hollow cylindrical drum, generally designated 12, mounted for rotation partially submerged in a tank 14, said tank containing a slurry to be filtered. Drum 12 is provided with a stationary externally held valve element, generally designated 16, mounted generally centrally of the drum on its tank 14 and at least partially surrounding the drum. The valve element 16 is provided with suitable ports 15, 17 on its sides for connection to the series of axially extending filtrate compartments on each side of valve element 16, such filtrate compartments being defined at their sides by a plurality of axially extending and radially upstanding imperforate rib elements 22 spaced from one another to define a plurality of axially aligned filtrate compartments on the surface of said drum throughout its circumference. Between the imperforate rib elements are provided two similar but perforate suporting rib elements 24, 26 having openings 25, 27 respectively therethrough. Drum 12 and disks 31, 32 provide closed outer ends for the filtrate compartments, their inner ends adjacent valve element 16 being open to the valve ports. Preferably, the drum surface is sloped radially inwardly from end disks 31, 32 toward valve element 16 to aid in filtrate drainage. For discharging filtrate from the valve element, and for applying subatmospheric pressure thereto if desired, drum 12 is provided with a spaced pair of inner disks 34, 35 connected by axially extending tie member 36 providing a radial passageway 38 throughout the cross-section of the drum 12, said passageway 38 having an axial connection to a suitable source of sub-atmospheric pressure through pipe 18 which forms a part of drum 12 and is rotatably mounted in tank 14, and a stationary pipe elbow 20 about which pipe 18 rotates. The outer end of the drum is supported by stub shaft 33 extending outwardly from its end disk 32 and is rotatably mounted in suitable bearings.

More specifically, the externally mounted central valve element consists of a generally rectangular cross-section housing extending from a closed end wall 21 at which point the sub-atmospheric pressure is to be applied to the filtrate compartments (at the four o'clock position for clockwise rotation as shown in FIG. 2) to another closed end wall 23 (at the one o'clock position in FIG. 2) at which point it is desired to cut off the sub-atmospheric pressure for filter cake discharge, followed by submergence of the filtrate compartments. Throughout the so defined arc, the valve element is provided with ports 15, 17 communicating with the filtrate channel open ends, so that it is in effect positioned in a channel between said open ends partly surrounding the drum for about 270 degrees so that the drum rotates within the valve element. The inner wall of the valve element is open throughout such arc for communication with the pasageway between the inner disks, and the outer wall is closed. Suitable seals are provided between the stationary valve element and the rotating drum as best shown in FIG. 1. End walls 21, 23 should be wider than the peripheral distance across a filtrate compartment as defined by imperforate ribs 22 to prevent direct air flow between the accretion and discharge sectors.

With such arrangement, and with a source of sub-atmospheric pressure connected to elbow 20, filtrate will flow through the filter medium to accrete a filter cake from the four o'clock position in FIG. 2 until the filtrate passageways emerge from the slurry in the tank. They will continue to drain, and to move drying air through the filter cake until they move beyond end wall 23. In the 90 degree sector between end wall 23 and end wall 21, the sub-atmospheric pressure must be relieved for discharge of the filter cake over discharge roll 37. As shown in FIG. 2, this may best be accomplished by utilizing a solid bottom wall 39 as the bottom wall of the portion of the valve element 16 extending for said arc, venting the filtrate compartments of such portion to atmospheric air through their filter medium.

According to the present invention, the filter surface provided for the drum comprises a multiplicity of generally rectangular cover elements, each generally designated 40, supported in axially extending peripherally spaced position on the outer edges of rib elements 22, 24, 26. The individual cover elements 40 have their adjacent axial edges spaced from one another in a peripheral direction to provide an axially extending slot 42 therebetween for communication between the outer surface of the cover elements 40 and one of the filtrate compartments and otherwise to cover said filtrate compartments throughout the entire surface of the drum, so that all filtrate must pass through one of the slots 42 in order to reach the interior of the drum. Thus, each cover element 40 has an arcuate peripheral extent less than that of one only of said filtrate compartments as defined between imperforate rib elements 22. It is preferably supported along lines adjacent its opposite edges thereof by an imperforate rib element 22 and a perforate rib element 24, 26 with a perforate rib element 24 supporting each said filter element adjacent the center line thereof. Preferably the edge of each cover element most remote from slot 42 is preferably provided with notches and is bent at an angle of about 90 degrees to extend radially outwardly, with the cover element being attached at its bend to perforate supporting rib element 26, with the opposite edge extending beyond imperforate rib 22 and being there curved inwardly adjacent slot 42. The axial dimension of each cover element may conveniently be generally equal to half the axial length of drum 12, with the center valve structure herein described, or equal to the entire length of the drum with an end valve filter. Preferably, a slot 42 is positioned generally centrally of a filtrate compartment spaced from the adjacent imperforate rib elements 22 defining said compartment.

In order to provide a multiplicity of peripherally extending relatively short channels on its outer surface, each cover element 40 has a multiplicity of parallel ridge elements 44 extending outwardly beyond its outer convex surface spaced of the order of one half inch from one another providing grooves 46 therebetween having a substantial depth of about one half inch. The ridges and grooves thus extend in the direction of the curve of said convex surface, that is, peripherally of said cylindrical drum, with the radially outermost extent of said ridge elements defining a convex cylindrical outer surface spaced beyond the underlying surface of drum 12.

In order to define the channel lengths, suitable division strips 48 may be provided to fill grooves 46 along an axial line and so define angular groove portions of suitable peripheral length. Preferably the division strips 48 are positioned generally along a line closely adjacent to one side of each element 40 at the ends of said grooves in the direction of drum rotation angularly spaced in advance of the leading end of the underlying filtrate compartment, for operational reasons hereinafter more fully explained. A foraminous sheet filter medium 50 is provided to cover the convex side of ridge elements 44 to define filtrate passages along grooves 46, said sheet filter medium being attached about the outer periphery thereof in the usual manner.

As a particular feature of the invention, the ridge elements 44 are conveniently provided by utilizing a multiplicity of closely axially spaced turns of a helically wound peripherally extending wire, preferably of rectangular cross-section, which extends continuously around and throughout the length of the drum over and between the cover elements, not only to produce the ridges and grooves but also to secure the cover element 40 against rib elements 22, 24, 26. Rectangular notches 49 in the radially outwardly extending portions of cover elements 40 receive the wire and provide the division strips 48 which seal off the grooves. A sheet filter medium in the form of a woven wire screen is secured around the outer periphery of the wire wound about the drum.

In general, insofar as the operation of the drum filter of the invention is concerned, when a particular filtrate compartment is in submergence, the ports 15, 17 connect such filtrate compartment to a suitable source of suction such as a vacuum pump or barometric leg which is communicated through pipes 18 and 20 and passageway 38 to filtrate compartment defined between each pair of imperforate ribs 22 and through slots 42 to the inner side of filter medium 50, causing filtrate to flow therethrough and deposit a filter cake on the outer surface of said medium. Upon emergence of a filtrate compartment from the slurry in tank 14, with the drum moving in the direction as shown by the heavy arrows in the drawings, the ends of the filtrate channels as defined by the division strip 48 most remote from the slots 42, will first emerge and the filtrate will flow downwardly along the channels by gravity, in the opposite direction to that of drum movement, as shown by the light curved arrows in FIG. 4, that is, from right to left. Since the slot 42 is at the lower end of the channels and the division strip 48 is at a higher level than the filtrate in the compartment as defined by its uppermost rib, the channels will themselves operate in the nature of a valveless filter, both to aid in start-up, and, with a gravity filter, to itself operate as a barometric leg. However, since these and further principles of the use of peripherally extending channels of small cross sectional dimensions and short length directly underlying the filter surface have been fully set forth in Patent No. 2,998,883, they hence need not be further described herein. As to the filtrate compartments themselves, since the stationary valve structure is of the same diameter as that of the open ends of the filtrate compartment and is positioned immediately adjacent thereto, air will immediately flow directly into the emerging corner of the filtrate compartment and along it toward its remote end, so that the filtrate will be released for ready flow by gravity therealong in the direction toward its open end.

The angular, peripheral displacement of the slot 42 with respect to its underlying filtrate compartment is best shown in FIG. 4, wherein the slots 42 connect to the filtrate compartments defined as between a pair of adjacent imperforate ribs 22 at a point about one-third to one-half of the distance from their leading ends in the direction of drum movement to their trailing ends. At the emergence stage of the drum cycle, displacement of the slot from the trailing edge of the compartment prevents filtrate flowing therethrough from washing the filter cake off the screen. Additionally, it provides a head differential between the uppermost end of the channels as defined by the division strip and the uppermost end of the filtrate compartment as defined by a filtrate compartment, this being necessary for starting up. Also upon a filtrate compartment passing the 12 o'clock position the displacement functions to trap in the volume of the filtrate compartment between its leading end and the slot 42 any filtrate which has not yet had an opportunity to escape through drum openings 15, 17. This acts to prevent reabsorption by or "reblotting" of the filter cake by any filtrate which remains in the filtrate compartment, as might occur were the slots 42 to be positioned at the leading end of a filtrate compartment.

It will thus be seen that the novel rotary drum filter of the invention provides a uniquely useful construction which may be widely utilized in such filters. Various modifications of the invention within the spirit thereof and the scope of the appended claims will be apparent to those skilled in the art.

What is claimed is:
1. A rotary drum filter including
   a cylindrical drum,
   a plurality of axially extending and radially upstanding imperforate rib elements spaced from one another to define a plurality of axially extending filtrate compartments on the surface of said drum throughout its circumference,
   a plurality of axially and peripherally extending cover elements having an inner surface supported on the outer edges of said rib elements to provide a cover for the major arcuate portion of said filtrate compartments throughout the surface of said drum,
   each said cover element having an arcuate extent less than that of a said filtrate compartment, with adjacent cover elements spaced from one another in a peripheral direction providing an axially extending slot therebetween for communication between the outer surface of said cover elements and one of said filtrate compartments,
   peripherally extending ridge element means supported on the outer surface of each of said cover elements providing a multiplicity of ridge elements spaced from one another in an axial direction providing a multiplicity of peripherally extending grooves therebetween and
   a foraminous sheet filter medium covering the outer side of said ridge element means defining filtrate passages along said grooves.

2. A rotary drum filter as claimed in claim 1, further including supporting elements positioned between said upstanding rib elements defining said filtrate compartments, each said cover element being supported adjacent one of its axially extending edges by one of said supporting elements.

3. A rotary drum filter including
   a cylindrical drum,
   a plurality of axially extending and radially upstanding imperforate rib elements spaced from one another to define a plurality of axially extending filtrate compartments on the surface of said drum throughout its circumference,
   a plurality of axially and peripherally extending sheet material cover elements having an inner surface supported on the outer edges of said rib elements to provide a cover for the major arcuate portion of said filtrate compartments throughout the surface of said drum and having an outer convex surface curved in the form of a portion of a cylinder,
   each said cover element having an arcuate extent less than that of a said filtrate compartment, with adjacent cover elements spaced from one another in a peripheral direction providing an axially extending slot therebetween for communication between the outer surface of said cover elements and one of said filtrate compartments,
   a helically wound peripherally extending wire ridge element having a multiplicity of closely axially spaced turns supported on the outer surface of said cover elements providing a multiplicity of peripherally extending grooves beyond the outer surface of said cover elements and
   a foraminous sheet filter medium covering the outer convex side of said wire ridge element defining filtrate passages along said grooves.

4. A rotary drum filter as claimed in claim 3 wherein said wire ridge element extends generally continuously around and throughout the length of said drum.

5. A rotary drum filter as claimed in claim 4 wherein said wire element is of rectangular cross-section.

6. A rotary drum filter including
   a cylindrical drum,
   a plurality of axially extending and radially upstanding imperforate rib elements spaced from one another to define a plurality of axially extending filtrate compartments on the surface of said drum throughout its circumference,
   axially extending supporting elements positioned between said upstanding rib elements,
   a plurality of axially and peripherally extending sheet material cover elements having an inner surface supported on the outer edges of said rib elements and said supporting elements to provide a cover for the major arcuate portion of said filtrate compartments throughout the surface of said drum,
   each said cover element having an arcuate extent less than that of a said filtrate compartment and being supported adjacent one axial edge on one of said rib elements and adjacent its opposite axial edge on one of said supporting elements, with adjacent cover elements spaced from one another in a peripheral direction providing an axially extending slot therebetween for communication between the outer surface of said cover elements and one of said filtrate compartments,
   peripherally extending ridge element means supported on the outer surface of each of said cover elements providing a multiplicity of ridge elements spaced from one another in an axial direction providing a multiplicity of peripherally extending grooves therebetween, and a foraminous sheet filter medium covering the outer side of said ridge element means defining filtrate passages along said grooves.

7. A rotary drum filter as claimed in claim 6 wherein each said slot is located generally centrally of a filtrate compartment spaced from adjacent imperforate rib elements.

8. A rotary drum filter including
a cylindrical drum,
a plurality of axially extending and radially upstanding imperforate rib elements spaced from one another to define a plurality of axially extending filtrate compartments on the surface of said drum throughout its circumference,
axially extending supporting elements positioned between adjacent upstanding rib elements,
a plurality of axially and peripherally extending sheet material cover elements having an inner surface supported on the outer edges of said rib elements and said supporting elements to provide a cover for the major arcuate portion of said filtrate compartments throughout the surface of said drum, and having an outer convex surface curved in the form of a portion of a cylinder,
each said cover element having an arcuate extent less than that of a said filtrate compartment and being supported adjacent one axial edge on one of said rib elements and adjacent its opposite axial edge on one of said supporting elements, with adjacent cover elements spaced from one another in a peripheral direction providing an axially extending slot in an arcuate position between adjacent imperforate rib elements for communication between the outer surface of said cover elements and one of said filtrate compartments,
a helically wound peripherally extending wire ridge element having a multiplicity of closely axially spaced turns supported on the outer surface of said cover elements and extending therebetween providing a multiplicity of peripherally extending grooves beyond the outer surface of said cover elements,
division strip means positioned between the turns of said wire ridge element extending in an axial direction along a line parallel and adjacent to one side of each of said slots, and
a foraminous sheet filter medium covering the outer convex side of said wire ridge element defining filtrate passages along said grooves.

9. A rotary drum filter including:
a cylindrical drum;
a plurality of axially extending and radially upstanding imperforate rib elements spaced from one another to define a plurality of axially extending filtrate compartments located on the surface of said drum and around its circumference;
a plurality of axially and peripherally extending imperforate cover elements having an inner surface supported on the outer edges of said rib elements to provide a cover for the major arcuate portion of each of said filtrate compartments around the surface of said drum;
each said cover element having an arcuate extent less than that of a said filtrate compartment, with adjacent cover elements spaced from one another in a peripheral direction providing an axially extending slot therebetween for communication between the outer surface of said cover elements and one of said filtrate compartments;
peripherally extending and axially spaced ridge element means supported on the outer surface of each of said cover elements providing a multiplicity of ridge elements spaced from one another in an axial direction forming a multiplicity of peripherally extending grooves therebetween; and
a foraminous sheet filter medium covering the outer side of said ridge element means defining filtrate passages along said grooves.

10. The rotary drum filter as claimed in claim 9 including:
supporting elements positioned between said upstanding rib elements defining said filtrate compartments;
each said cover element being supported adjacent one of its axially extending edges by one of said supporting elements.

11. The rotary drum filter of claim 9 including:
an axially extending radially upstanding wall of low height mounted on the outer surface of each of said cover elements and abutting the under side of said foraminous sheet filter medium to separate the filtrate passages on the opposite sides of said wall.

12. The rotary drum filter of claim 11 wherein:
said wall includes a series of axially spaced notches for receiving said ridge element means in sealed relationship.

13. The rotary drum filter of claim 12 wherein:
said ridge element means including a plurality of turns of a wire element wound helically around said drum.

14. The rotary drum filter of claim 13 wherein:
said wall is located on the axially extending edge of its cover element which is the leading edge of the cover element in the normal direction of rotation of said drum.

No references cited.

REUBEN FRIEDMAN, *Primary Examiner.*

SAM ZAHARNA, *Assistant Examiner.*